United States Patent [19]

Ulich et al.

[11] Patent Number: 4,967,270
[45] Date of Patent: Oct. 30, 1990

[54] LIDAR SYSTEM INCORPORATING MULTIPLE CAMERAS FOR OBTAINING A PLURALITY OF SUBIMAGES

[75] Inventors: Bobby L. Ulich, Tucson, Ariz.; R. Norris Keeler, McLean, Va.; Kent Phlibsen, Tucson, Ariz.

[73] Assignee: Kaman Aerospace Corporation, Bloomfield, Conn.

[21] Appl. No.: 364,860

[22] Filed: Jun. 12, 1989

Related U.S. Application Data

[63] Continuation-in-part of Ser. No. 348,746, May 8, 1989, abandoned.

[51] Int. Cl.$^5$ .............................................. H04N 7/00
[52] U.S. Cl. .......................................... 358/95; 356/5
[58] Field of Search ..................... 358/95, 83, 100, 99, 358/211, 113, 125, 110; 356/5, 6

[56] References Cited

U.S. PATENT DOCUMENTS

| | | |
|---|---|---|
| 2,541,374 | 2/1951 | Morton . |
| 2,996,946 | 8/1961 | Brendholdt . |
| 3,278,753 | 10/1966 | Pihs et al. . |
| 3,305,633 | 2/1967 | Chernoch . |
| 3,360,793 | 12/1987 | Collis . |
| 3,380,358 | 4/1968 | Neumann . |
| 3,426,207 | 2/1969 | Fried et al. . |
| 3,446,555 | 5/1969 | Kahn . |
| 3,446,556 | 5/1969 | Collis . |
| 3,467,773 | 9/1969 | Heckman, Jr. . |
| 3,499,110 | 7/1970 | Heckman, Jr. . |
| 3,527,533 | 9/1970 | Hook et al. . |
| 3,527,881 | 9/1970 | Blanchard . |
| 3,555,178 | 1/1971 | Humiston . |
| 3,566,021 | 2/1971 | Jakes, Jr. . |
| 3,604,803 | 9/1971 | Kahn . |
| 3,649,124 | 3/1972 | Takaoka et al. . |
| 3,669,540 | 6/1972 | Rathman et al. . |
| 3,669,541 | 6/1972 | Duguay . |
| 3,670,098 | 6/1972 | Korpel . |
| 3,674,925 | 7/1972 | Heckman, Jr. . |
| 3,682,553 | 8/1972 | Kapany . |
| 3,689,156 | 9/1972 | Kerpchar . |
| 3,723,648 | 3/1973 | Cornsweet . |
| 3,743,418 | 7/1973 | Heflinger . |
| 3,761,180 | 9/1973 | Maxwell, Jr. et al. . |
| 3,781,552 | 12/1973 | Kadrmas . |
| 3,782,824 | 1/1974 | Stoliar et al. . |
| 3,834,795 | 9/1974 | Erickson et al. . |
| 3,886,303 | 5/1975 | Morris . |
| 3,895,388 | 7/1975 | Townsend . |
| 3,897,150 | 7/1975 | Bridges et al. . |
| 3,899,250 | 8/1975 | Bamberg et al. . |
| 3,902,803 | 9/1975 | Lego, Jr. . |
| 3,934,082 | 1/1976 | Gordon . |
| 3,947,119 | 3/1976 | Bomberg et al. . |
| 4,030,831 | 6/1977 | Gowrinathan . |
| 4,050,819 | 9/1977 | Lichtman . |
| 4,129,780 | 12/1978 | Laughlin . |
| 4,143,400 | 3/1979 | Heckman, Jr. et al. . |
| 4,174,524 | 11/1979 | Moran . |
| 4,193,088 | 3/1980 | Moran . |
| 4,195,221 | 3/1980 | Moran . |
| 4,195,311 | 3/1980 | Moran . |
| 4,197,088 | 4/1980 | Meserol et al. . |
| 4,199,253 | 4/1980 | Ross . |
| 4,226,529 | 10/1980 | French .............................. 358/95 X |
| 4,239,388 | 12/1980 | Green . |
| 4,270,142 | 5/1981 | Mackelburg et al. . |
| 4,277,167 | 7/1981 | Eppel . |
| 4,298,280 | 11/1981 | Harney . |
| 4,380,391 | 4/1983 | Buser et al. . |

(List continued on next page.)

Primary Examiner—Howard W. Britton
Assistant Examiner—Victor R. Kostak
Attorney, Agent, or Firm—Fishman, Dionne & Cantor

[57] ABSTRACT

An improved imaging light detection and ranging (lidar) system is presented which provides variable time delay range gating across a selected image. Variable time delay range gating across an image is accomplished using a plurality of imaging cameras which are individually triggered after preselected delays to obtain multiple subimages. These multiple subimages are then put together in a mosaic in a computer to provide a complete image of a target plane using only one light pulse.

12 Claims, 1 Drawing Sheet

U.S. PATENT DOCUMENTS

| | | |
|---|---|---|
| 4,397,549 | 8/1983 | Morgan . |
| 4,515,471 | 5/1985 | Eden . |
| 4,515,472 | 5/1985 | Welch . |
| 4,518,254 | 5/1985 | Penny et al. . |
| 4,603,250 | 7/1986 | Contini et al. . |
| 4,634,272 | 1/1987 | Endo . |
| 4,639,590 | 1/1987 | Butterwick . |
| 4,646,140 | 2/1987 | Bailey et al. . |
| 4,687,326 | 1/1987 | Corby, Jr. . |
| 4,688,086 | 8/1987 | Hutchin . |
| 4,708,473 | 11/1987 | Metzdorff et al. . |
| 4,717,252 | 1/1988 | Halldorsson et al. . |
| 4,727,259 | 2/1988 | Haluis . |
| 4,754,151 | 6/1988 | Billard . |
| 4,757,200 | 7/1988 | Shepherd . |
| 4,796,090 | 1/1989 | Fraier . |

LIDAR SYSTEM INCORPORATING MULTIPLE CAMERAS FOR OBTAINING A PLURALITY OF SUBIMAGES

BACKGROUND OF THE INVENTION

This invention relates generally to an imaging light detection and ranging (lidar) system. More particularly, this invention relates to a lidar system which is adapted to accomplish variable time delay range gating across a selected image.

An imaging light detection and ranging (LIDAR) system is generally depicted in FIG. 1. The LIDAR system of FIG. 1 is of the type described in U.S. Patent Application Serial Nos. 216,341 filed July 7, 1988, now U.S. Pat. No. 4,862,275 and 256,778 filed Oct. 12, 1988, both of which are assigned to the assignee hereof and incorporated herein by reference.

In the Lidar system of FIG. 1, a pulsed light source 10 (such as a pulsed laser) emits a brief intense illuminating pulse of light 12 toward a backscattering medium 13 upon receiving a signal from timing electronics 14 (e.g. timing generator). After a time delay corresponding to the round trip propagation time $t=2Rn/c$ (where n is the index of refraction of the propagation medium, R is the target range and c is the velocity of light propagation in a vacuum); a second timing signal is sent from timing generator 14 to a range-gated camera 16. Upon receipt of this signal, camera 16 opens its shutter for a brief period $\delta t=(2n/C)(\delta R)$ seconds, whereby reflection images of all targets 17 within the angular field of view 18 of camera 16 and within the range gate $\delta R$ are formed at the camera output.

As can be seen in FIG. 1, the surface of constant time delay is not planar, but is actually a sphere, a section of which is shown in the two-dimensional FIG. 1 as an arc of a circle 20.

However, for some applications, it is desired to image a plane (as opposed to a sphere) in target space, as shown by the dashed line 22 in FIG. 1. In current lidar systems, the time delay is constant over the entire field of view, resulting in the imaging of only an annulus 24 at target image plane 22. The light from the target areas inside and outside this annulus are received either before (inside area identified at 26) or after (e.g., outside areas identified at 28) the image from range R. Therefore, a large part of target plane 22 is not imaged by camera 16 in a single picture. Moreover, the picture which is imaged will vary in intensity for different values of range R if the propagation medium is not perfectly transparent.

SUMMARY OF THE INVENTION

The above-discussed and other problems and deficiencies of the prior art are overcome or alleviated by the improved lidar system of the present invention. In accordance with the present invention, multiple cameras are used in conjunction with independent delay timing control such that each camera is individually triggered after a predetermined delay to obtain target images (e.g., subimages) of only a part of the target plane. The subimages received from each camera are then put together in a mosaic in a computer to provide a complete image of the target plane using only one light pulse.

The present invention thus provides variable time delay range gating across a selected target scene which overcomes the deficiencies associated with known lidar systems. The above-discussed features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 2:
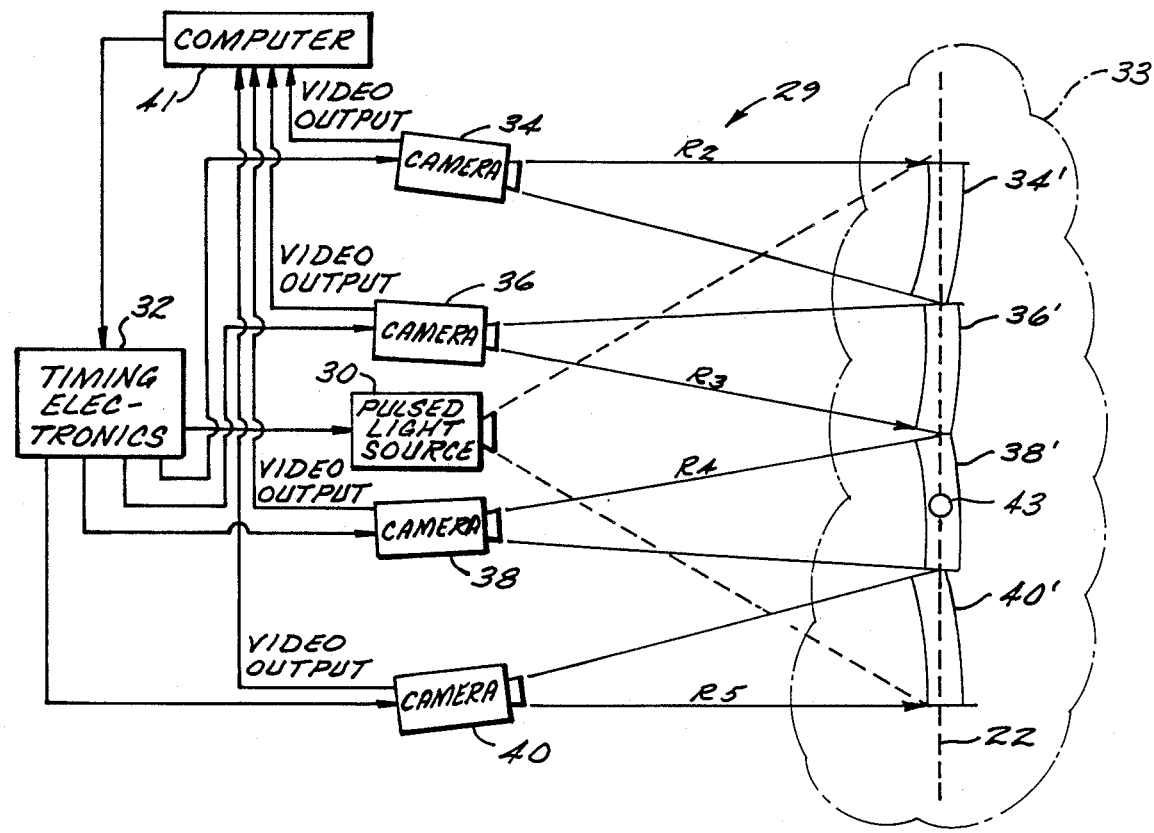
FIGS. 2 is a schematic diagram of a lidar system incorporating multiple imaging cameras having synchronized time delay range gating in accordance with the present invention.

Referring now to FIG. 2, a lidar system in accordance with the present invention is shown generally at 29. In accordance with the present invention, the problems of the prior art are overcome by the use of multiple cameras with each camera viewing a part of the target plane 22; the multiple cameras being associated with independent delay timing control. In FIG. 2, a pulsed light source 30 is triggered by a timing generator 32 toward a backscattering medium 33. After some predetermined delays, each of the multiple cameras 34, 36, 38 and 40 are individually triggered to obtain the target images from reflections at the respective distances $R_2$ to $R_5$. Using the system of FIG. 2, the entire area of the target image plane 22 is now covered by the multiple subimages 34', 36', 38', and 40' which are then put together in a mosaic in a computer 41 to provide a complete image of target plane 22 (and an object 43 within the target plane) using only one light pulse.

The lidar system shown in FIG. 2 is a one-dimensional imager capable of producing strip images in the direction of the plane of FIG. 2 along target plane 22. For more complete area coverage, the multiple camera array must be made two-dimensional to approximate not just a linear strip, but a planar imaging surface.

The lidar system of FIG. 2 requires precise optical alignment of cameras 34-40 so that computer system 41 may accurately synthesize a mosaic image. Precise alignment of the cameras permits the subimages obtained by each camera to be properly registered in the final composite or mosaic image. The intensity variations among subimages may be corrected by scaling the intensity of each subimage by a factor proportional to the square of the subimage range to correct for geometric darkening before the composte mosaic image is formed. In addition, light loss due to absorption and scattering by the propagation medium may also be compensated in the computer to produce a uniformly bright mosaic image.

Figure 1:
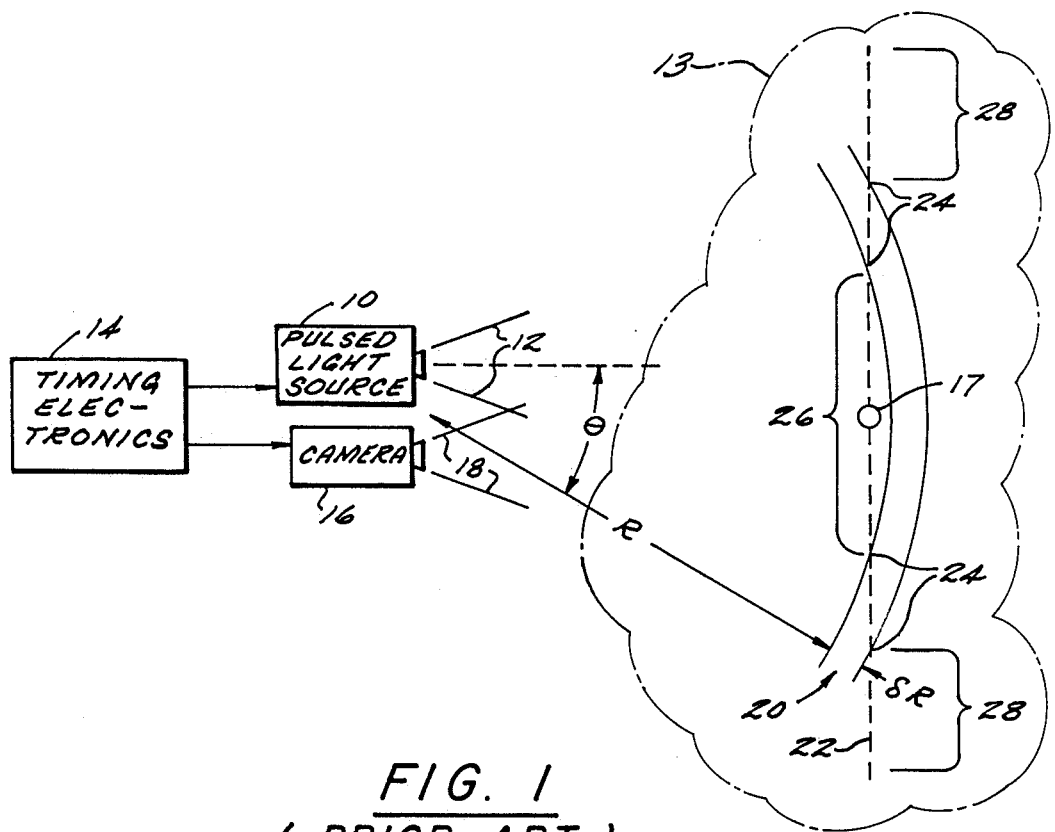
FIG. 1 is a schematic diagram of a known lidar system.

A computer controlled time delay generator 32 with multiple outputs may be used to produce variable time delays across each subimage according to the methods described herein. Thus, camera 16 of the lidar system of FIG. 1 (or the lidar systems described in U.S. Pat. Application Serial Nos. 215,341 and 256,778 and U.S. Pat. No. 4,862,257) may be replaced with the multiple camera system of the present invention to achieve variable time delay range gating across a selected image.

The several components of the lidar system of this invention including cameras 34, 36, 38, 40, pulsed light source 30 and the timing electronics 32 are all more fully described in U.S. Pat. No. 4,862,257 and USSN 256,778 which have been incorporated herein by reference.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An apparatus for detecting and imaging an object enveloped by a backscattering medium which is at least partially transmitting to light comprising:
   generating means for selectively generating short pulses of light;
   projecting means for projecting said short pulses of light toward the backscattering medium and at an object enveloped by the medium;
   detecting means for detecting said pulses of light reflected back from said object after a time delay corresponding to the round-trip propagation time of said light pulses to and from said object; and
   converting means for converting said detected pulses of light to a video image of said object;
   wherein said detecting means further comprises;
   a plurality of cameras directed laterally across a target image, each of said cameras obtaining a subimage of said target image;
   time delay generator means for selectively gating each of said cameras after a predetermined time delay to produce variable time delay gating across said target image viewed by said cameras.

2. The apparatus of claim 1 including:
   means for combining all of the subimages from said cameras into a composite image.

3. The apparatus of claim 1 wherein:
   said cameras are gated after one pulse from said generating means.

4. The apparatus of claim 1 wherein:
   said target image is a planar image.

5. A method of detecting and imaging an object enveloped by a backscattering medium which is at least partially transmitting to light including the steps of:
   selectively generating short pulses of light;
   projecting said short pulses of light toward the backscattering medium and at an object enveloped by the medium;
   detecting said pulses of light reflected back from said object after a time delay corresponding to the round-trip propagation time of said light pulses to and from said object;
   converting said detected pulses of light to a video image of said object;
   wherein said step of detecting said reflected pulses of light further includes using a detecting means comprising;
   a plurality of cameras being directed laterally across a target image, each of said cameras obtaining a subimage of said target image; and
   time delay generator means for selectively gating each of said cameras after a predetermined time delay to produce variable time delay gating across said target image viewed by said cameras.

6. The method of claim 5 including:
   combining all of the subimages from said cameras into a composite image.

7. The method of claim 5 including:
   gating said cameras after one pulse from said generating means.

8. The method of claim 5, wherein:
   said target image is a planar image.

9. An apparatus for detecting and imaging an object enveloped by a backscattering medium which is at least partially transmitting to light comprising:
   generating means for selectively generating short pulses of light;
   projecting means for projecting said short pulses of light toward the backscattering medium and at an object enveloped by the medium;
   detecting means for detecting said pulse of light reflected back from said object after a time delay corresponding to the round-trip propagation time of said light pulse to and from said object; and
   converting means for converting said detected pulses of light to a vide image of said object;
   wherein said detecting means further comprises;
   a plurality of cameras;
   time delay generator means for selectively gating each of said cameras after a predetermined time delay to produce variable time delay gating across an image viewed by said cameras;
   wherein each of said cameras obtains a subimage; and including
   means for combining all of the subimages from said cameras into a composite image.

10. The apparatus of claim 9 wherein:
    said target image is a planar image.

11. A method of detecting and imaging an object enveloped by a backscattering medium which is at least partially transmitting to light including the steps of:
    selectively generating short pulses of light;
    projecting said short pulses of light toward the backscattering medium and at an object enveloped by the medium;
    detecting said pulses of light reflected back from said object after a time delay corresponding to the round-trip propagation time of said light pulses to and from said object;
    converting said detected pulses of light to a video image of said object;
    wherein said step of detecting said reflected pulses of light further includes using a detecting means comprising:
    a plurality of cameras;
    time delay generator means for selectively gating each of said cameras after a predetermined time delay to produce variable time delay gating across an image viewed by said cameras;
    wherein each of said cameras obtains a subimage; and including
    combining all of the subimages from said cameras into a composite image.

12. The method of claim 11 wherein:
    said target image is a planar image.

* * * * *